S. D. STEAD.
MANUFACTURE OF CLEANING WASTE.
APPLICATION FILED SEPT. 22, 1914.
1,157,816.　　　　　　　　　　　　　Patented Oct. 26, 1915.
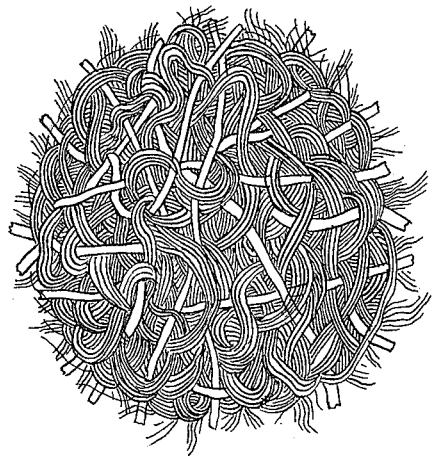
Witnesses　　　　　　　　　　　　Inventor
Albert Popkins　　　　　　　　　Squire Diggle Stead
Grace P. Brereton　　　　　　　By
　　　　　　　　　　　　　　　　Sturtevant & Mason
　　　　　　　　　　　　　　　　　　Attorneys,

UNITED STATES PATENT OFFICE.

SQUIRE D. STEAD, OF LIVERPOOL, ENGLAND.

MANUFACTURE OF CLEANING-WASTE.

1,157,816. Specification of Letters Patent. Patented Oct. 26, 1915.

Application filed September 22, 1914. Serial No. 862,891.

*To all whom it may concern:*

Be it known that I, SQUIRE DIGGLE STEAD, a subject of the King of Great Britain, residing at Liverpool, in the county of Lancaster, in the Kingdom of England, have invented certain new and useful Improvements in the Manufacture of Cleaning-Waste, of which the following is a specification.

This invention has for its object the utilization of two comparatively waste substances for cleaning waste.

The ordinary cotton mill waste, being composed of short spun threads of cotton and hereafter called cotton waste, is rather expensive, and is not as absorbent as some kinds of paper. Waste paper can be got for probably not one farthing a pound, but when shaved up into threads is too fragile to act as waste alone. I have found however, that cotton waste and paper sliced into thread or fine tape-like pieces acts splendidly for cleaning waste, the cotton waste giving the strength, and the paper waste the absorption and the cheapness.

In carrying out my invention, I may card or comb out the cotton waste in any ordinary manner. To make the paper waste, I take ordinary paper the less sizing there is in it the better, place it in a machine which will slowly feed it forward under a rapidly reciprocating knife having usually from half an inch to six inches of paper in thickness under the feed. The reciprocating knife shears the paper into fine threads or narrow strips. The feed is preferably so arranged as to give an equal forward motion after each stroke of the knife, consequently all the threads are of the same breadth, and their length varies with the width of the waste paper being used. In this way, old books, newspapers, letters and indeed paper of all kinds can be made up into waste. If the cotton waste has been combed or carded out into a thin layer, the requisite thickness of layer of paper is fed in over it, or otherwise mixed with it, and when the two are rolled up together, they become pretty evenly mixed and form the waste, the subject of my invention. The original materials can be left in their original color, or dyed as required. The drawing shows a small specimen of my waste in which the threads are cotton waste and the thin tapes are paper.

I declare that what I claim is:—

1. The improvement in the manufacture of cleaning waste, which consists in cutting paper into long narrow strips, carding ordinary cotton waste into thin sheets, and rolling the two together.

2. As a new article of manufacture, a waste consisting of ordinary cotton waste and thin threads or strips of paper mixed up together.

In witness whereof, I have hereunto signed my name this 9th day of Sept., 1914, in the presence of two subscribing witnesses.

S. D. STEAD.

Witnesses:
 A. C. JOHNSTON,
 J. McCORMICK.